W. J. RICHARDS.
MECHANISM FOR UNLOADING COMPRESSORS FOR STARTING.
APPLICATION FILED DEC. 6, 1913.
1,230,925.
Patented June 26, 1917.
7 SHEETS—SHEET 2.
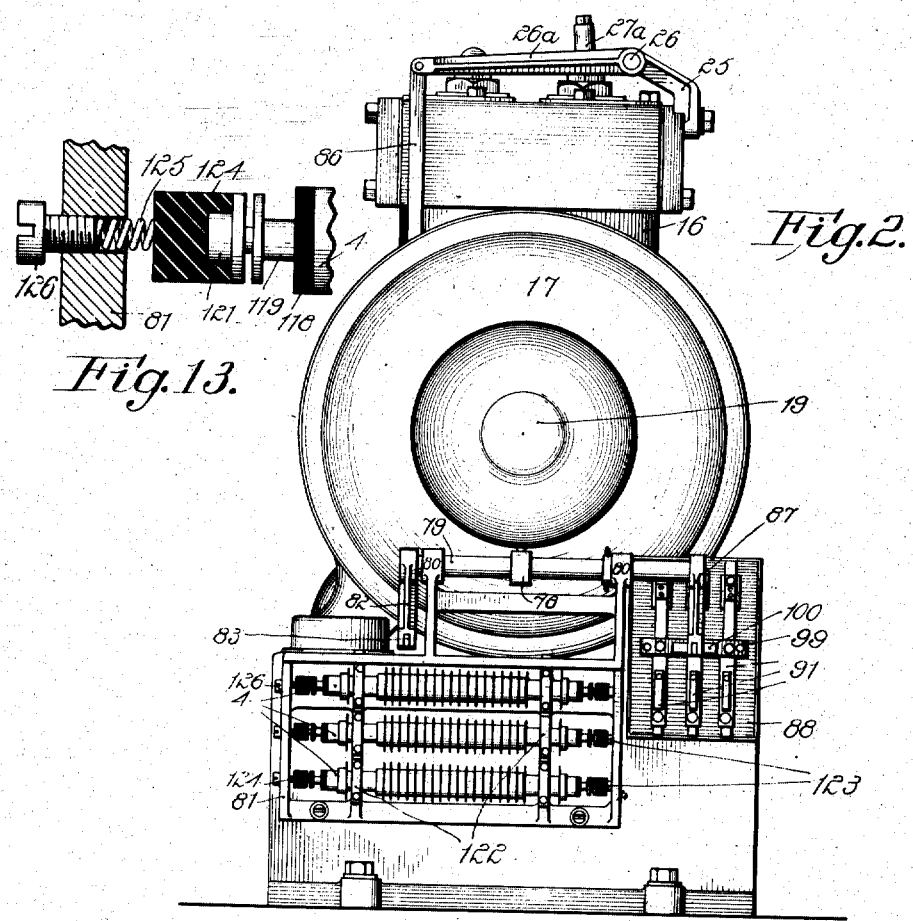
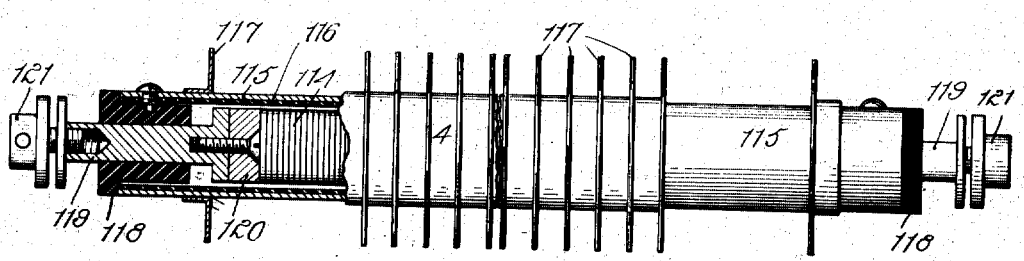
Witnesses:
Robert F. Brack
Leonard E. Bogue
Inventor
Walter J. Richards
By Brown Williams Bell Hanson & Boettcher
Attorneys.

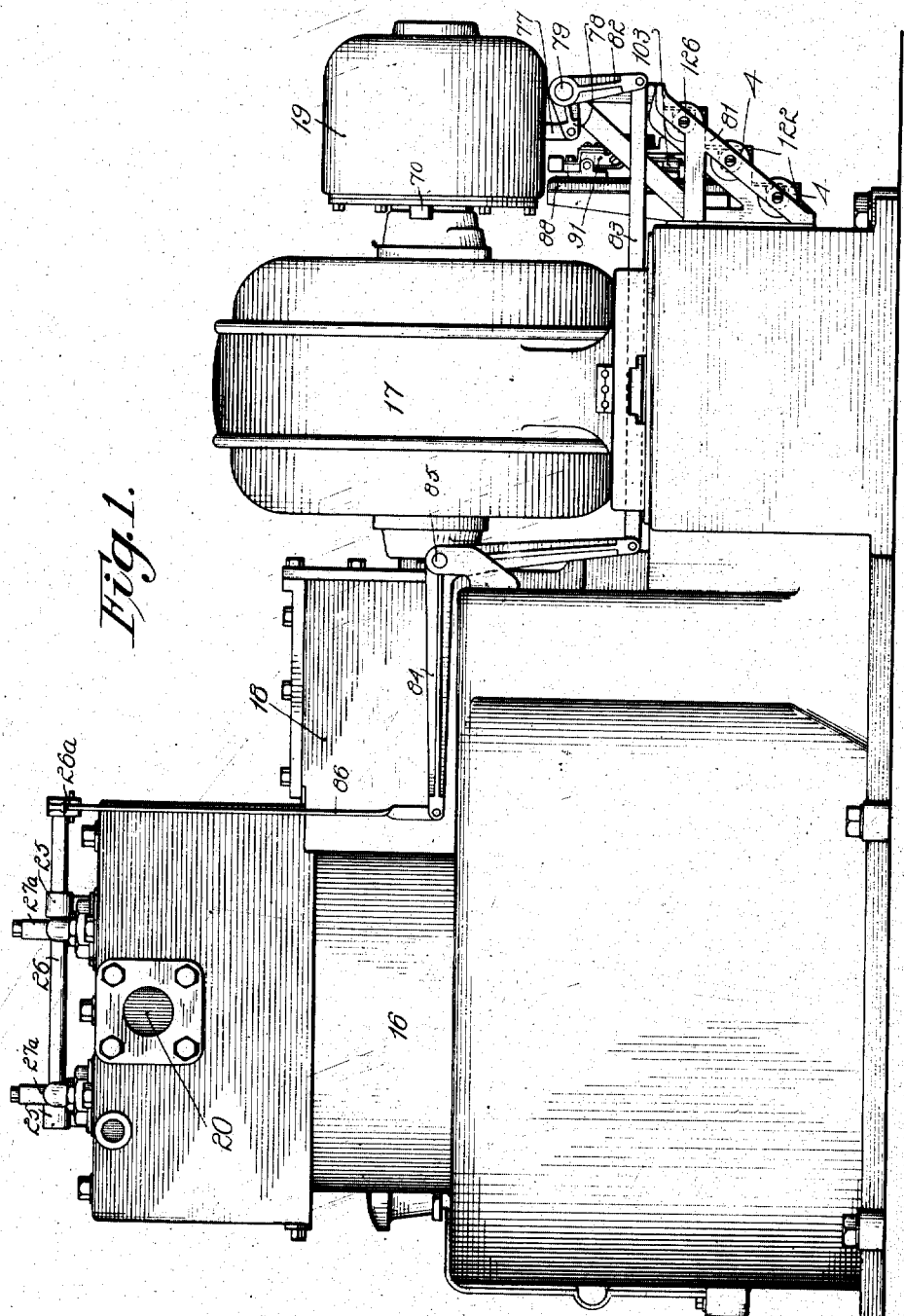

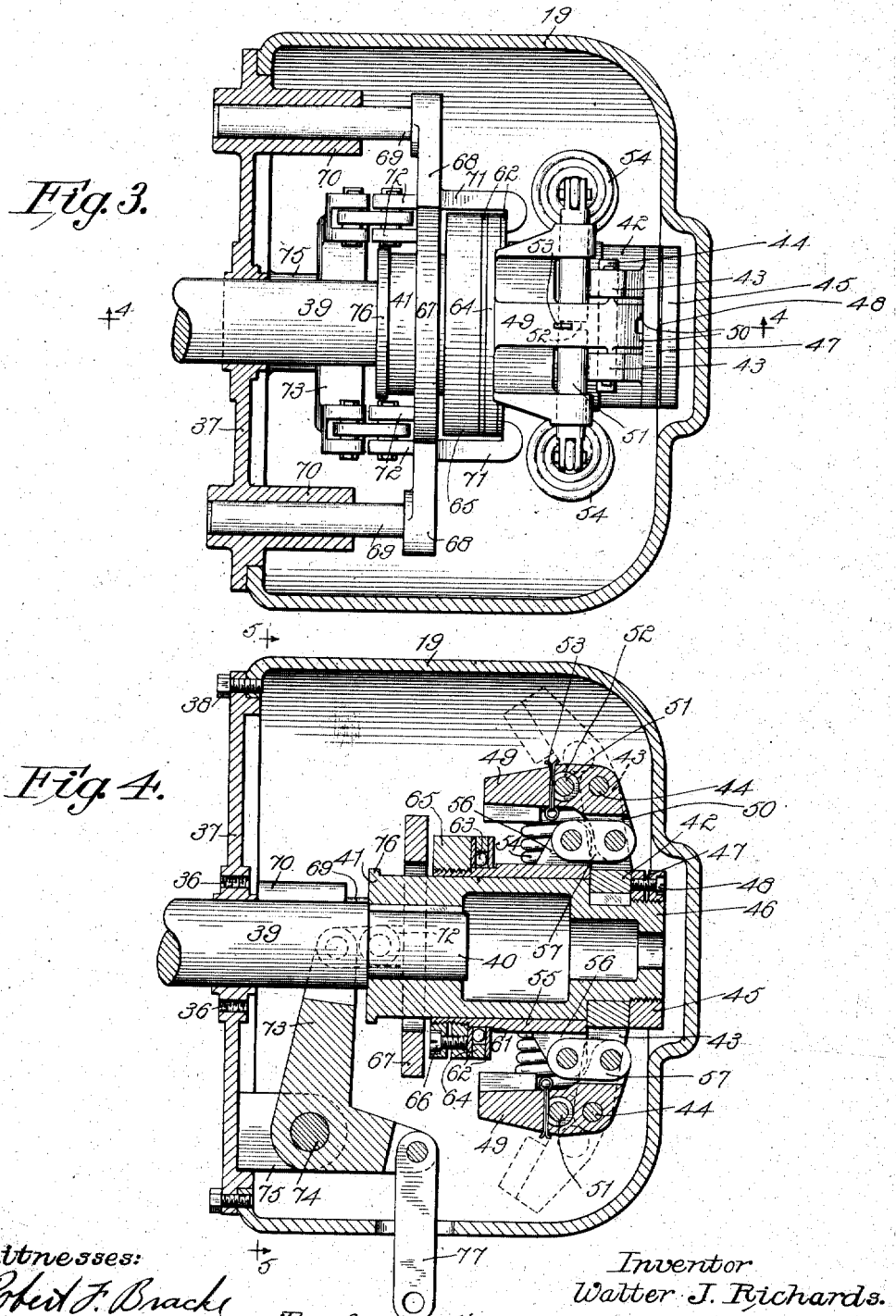

W. J. RICHARDS.
MECHANISM FOR UNLOADING COMPRESSORS FOR STARTING.
APPLICATION FILED DEC. 6, 1913.

1,230,925.

Patented June 26, 1917.
7 SHEETS—SHEET 4.

Witnesses:
Robert F. Bracke
Leonard E. Bogue

Inventor
Walter J. Richards.
By Brown, Williams, Bell, Hansen & Boettcher
Attorneys.

W. J. RICHARDS.
MECHANISM FOR UNLOADING COMPRESSORS FOR STARTING.
APPLICATION FILED DEC. 6, 1913.

1,230,925.

Patented June 26, 1917.
7 SHEETS—SHEET 5.

Witnesses:
Robert F. Brackl
Leonard E. Bogue

Inventor
Walter J. Richards
By Brown Williams Bell Hanson & Boettcher
Attorneys

W. J. RICHARDS.
MECHANISM FOR UNLOADING COMPRESSORS FOR STARTING.
APPLICATION FILED DEC. 6, 1913.

1,230,925.

Patented June 26, 1917.
7 SHEETS—SHEET 6.

Witnesses:
Robert F. Brackl
Leonard E. Bogue

Inventor
Walter J. Richards
By Brown Williams, Bell Hanson & Boettcher
Attorneys.

UNITED STATES PATENT OFFICE.

WALTER J. RICHARDS, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

MECHANISM FOR UNLOADING COMPRESSORS FOR STARTING.

1,230,925.  Specification of Letters Patent.  Patented June 26, 1917.

Application filed December 6, 1913. Serial No. 804,958.

*To all whom it may concern:*

Be it known that I, WALTER J. RICHARDS, a citizen of the United States, residing at Milwaukee, in the county of Milwaukee and State of Wisconsin, have invented a certain new and useful Improvement in Mechanism for Unloading Compressors for Starting, of which the following is a full, clear, concise, and exact description, reference being had to the accompanying drawings, forming a part of this specification.

My invention relates to an improved form of controlling mechanism for motors used in connection with air compressors by which the load upon the motor is automatically removed during the starting of the motor in order that the motor may be brought nearly or quite to its full speed before the load of the compressor is placed upon it. In carrying out my invention I make use of novel controlling mechanism by which the valves of the compressor are operated so as to prevent the effective operation of the compressor while the motor is being started, said controlling mechanism being automatically actuated by means of a centrifugal device operatively connected with the motor shaft. Thus, although the compressor is mechanically connected with the motor during the time the motor is being started, it does not impose anything but a frictional load upon the motor during the starting operation, as the pressure in the compressor is relieved by holding the suction valve open during starting operation.

In the preferred embodiment of my invention I provide a purely mechanical connection between the centrifugal device and the devices for operating the valves of the compressor to prevent compression within the compressor cylinders during the time the motor is being started. The centrifugal device forming a part of the mechanism of my invention also controls suitable switching mechanism interposed in the motor circuit. When the motor is started I prefer to close the circuit therefor through special resistances, and these resistances are so constructed that their resistance to the flow of electric energy becomes less after the current has been flowing for some time than is the resistance at the time the circuit is closed, and therefore, after the motor has been running for some time, a greater amount of energy is supplied thereto with a consequent increase in the speed of the motor. As the speed of the motor continues to increase, the centrifugal device mechanically connected with the motor shaft is operated to cut out the resistances mentioned, thus causing the motor to speed up. Shortly after the resistances are cut out of the motor circuit, the devices for controlling the valves of the compressor are operated to permit the compressor to operate and thus the load of the compressor is thrown upon the motor, but not until the motor has attained its maximum or nearly its maximum speed.

The motor employed is preferably an induction motor of either the squirrel-cage or slip-ring type, although I do not wish to limit myself to any particular form of motor. The centrifugal device mechanically connected with the motor shaft is of novel construction, as will be made evident as the following description progresses. Moreover, the switching mechanism for cutting the resistances out of the motor circuit is of special construction in order that it may perform its function at exactly the right time without arcing at the contact points.

These and other features of the mechanism of my invention are more fully set forth in the following description and are illustrated in the accompanying drawings in which—

Figure 1 shows in side elevation an electric motor, an air compressor driven therefrom, the centrifugal device driven from the electric motor, the devices for operating the valves of the compressor to prevent compression in the compressor cylinders during the time the motor is being started, the connections between said devices and the centrifugal device, the resistances adapted to be included in the motor circuit, and the switching mechanism which determines whether or not said resistances are included in the motor circuit;

Fig. 2 is an end elevational view of the parts illustrated in Fig. 1;

Fig. 3 is a horizontal sectional view of the centrifugal device mechanically connected with the motor shaft;

Fig. 4 is a vertical sectional view of the centrifugal device taken on the line 4, 4 of Fig. 3.

Fig. 12 is a view partly in elevation and partly in section of one of the resistances adapted to be included in circuit with the motor;

Fig. 13 is a fragmentary view illustrating means for manually adjusting the resistances;

Similar reference numerals refer to similar parts throughout the several views.

Figure 5:
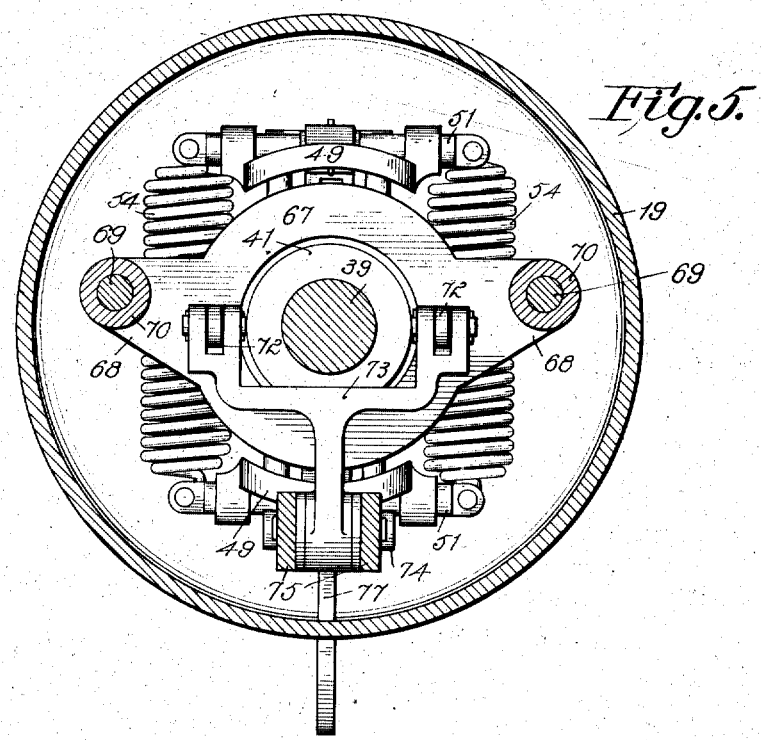
Fig. 5 is a sectional view of the centrifugal device taken on the line 5, 5, of Fig. 4.

As is illustrated in the drawings, a two-cylinder compressor 16 is driven from an induction motor 17 through suitable gearing not shown, located within a housing 18. The motor shaft is mechanically connected with centrifugal mechanism located within a housing 19, which housing is rigidly secured to one of the shaft bearings of the motor framework. I shall first describe the mechanism for controlling the valves of the compressor, then the centrifugal device and then the electrical connections and the means for controlling the motor circuit.

Figure 6:
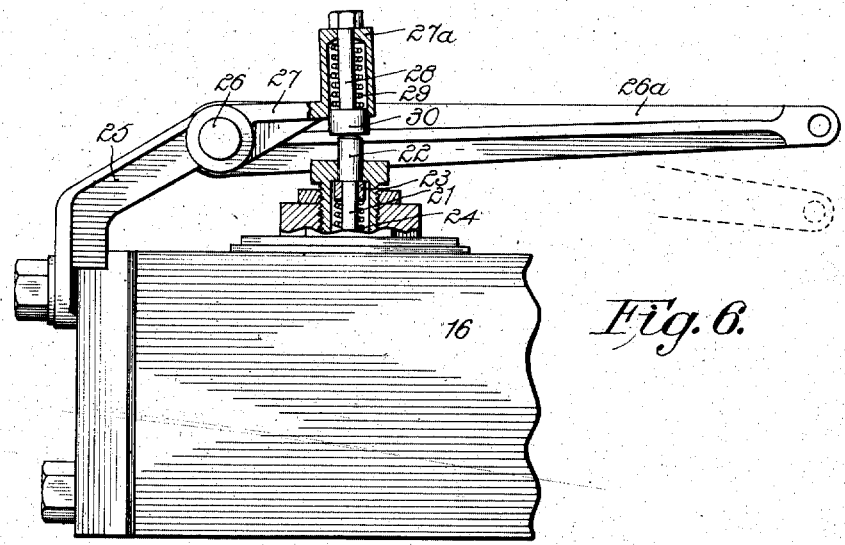
Fig. 6 is a fragmentary view, partly in section and partly in elevation, illustrating the mechanism for preventing compression in the compressor cylinders during the time the electric motor is being started.
Figure 7:
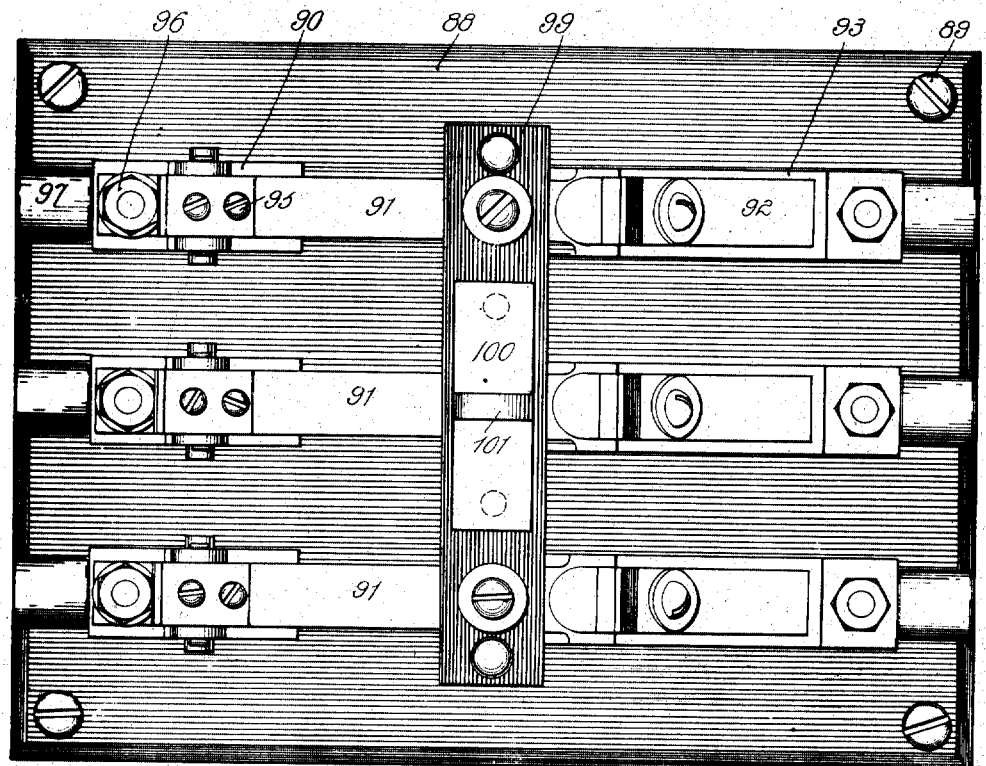
Fig. 7 is a plan view of the electric switching mechanism employed when an induction motor of the squirrel-cage type is used to drive the compressor.
Figure 8:
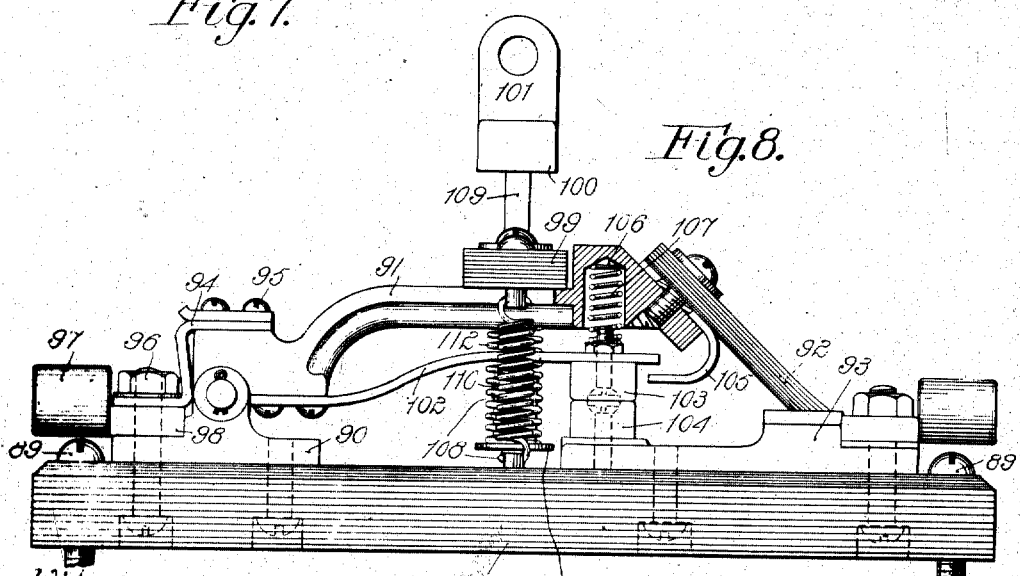
Fig. 8 is a side elevational view of the switching mechanism shown in Fig. 7.
Figure 9:
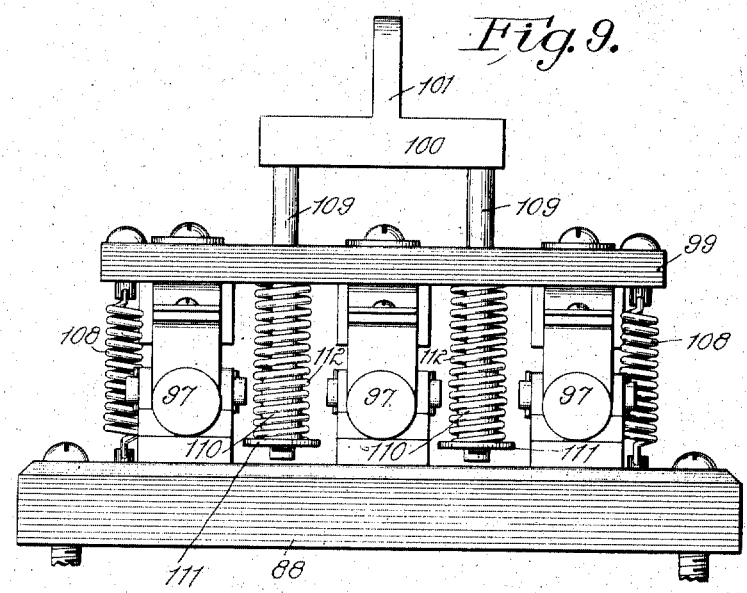
Fig. 9 is an end elevational view of the switching mechanism shown in the two preceding figures.

The compressor shown in Figs. 1, 2 and 6 is provided with suitable exhaust valves, which at the proper times permit the fluid compressed in the compressor cylinders to pass out through the exhaust port 20, and suitable inlet valves, which at the proper times permit communication between the compressor cylinders and an inlet port located on the side of the compressor opposite the exhaust port 20.

Mounted on the top of the compressor and directly over each of the inlet valves is a plunger 21 having a portion 22 of enlarged diameter. Encircling the smaller portion of the plunger 21 and abutting against the shoulder formed by the enlarged portion 22 is a collar 23, against which bears a compression spring 24 normally tending to raise the plunger 21 to the position illustrated in Fig. 6. When either one of the plungers 21 is in the position shown in Fig. 6, the inlet valve with which it is associated is permitted to operate normally—that is, to open and permit air to pass to its associated compressor cylinder on the intake stroke of the piston within said cylinder and to close during the compression stroke of the piston, in order that the air within the cylinder may be compressed. It will be seen that if either one of the plungers 21 is depressed, its associated inlet valve will be held off its seat and consequently the compression of air contained within the compressor cylinder with which said valve is associated will be prevented.

The inlet valves for the compressor cylinders are not illustrated in detail, as these valves are well known to those skilled in the art. It will suffice to say that I provide plungers normally held in raised position by suitable spring mechanism and which plungers, when in depressed position, retain associated inlet valves off their seats and so prevent compression within the compressor cylinders.

Secured to the compressor by bolts or other equivalent means are the brackets 25, in which brackets is journaled the shaft 26, said shaft being provided at one end thereof with an operating arm 26ª, which will be presently referred to. Rigidly mounted upon the shaft 26 are the arms 27, each of which is provided at its free end with a hollow portion 27ª located directly over one of the plungers 21. Slidable in the hollow portion 27ª of each of the arms 27 is a plunger 28, which is adapted to bear against the top of the adjacent plunger 21. Suitable compression springs 29 disposed in the hollow portions 27ª of the arms 27 and bearing against the shoulders formed by the enlarged portions 30 of the plungers 28 normally tend to retain each of the plungers in the positions illustrated in Fig. 6.

The arm 26ª connected with the shaft 26 is provided so that at the proper time suitable mechanism to be hereinafter described in detail may operate the arm 26ª to rotate the shaft 26 and so move the arms 27 in a clockwise direction. It will readily be seen that when the arm 26ª is operated and the shaft turned in a clockwise direction, the compressor being operated, the springs 29 associated with the plungers 28 disposed over each of the inlet valves will yield until their associated inlet valve is unseated upon the intake stroke of the piston within its associated cylinder, and that thereupon the said spring 29 holds the inlet valve off its seat. Thus, although both arms 27 are rigidly connected with the shaft 26 and are moved when said shaft is turned, the springs 29 yield as above set forth until each of the valves is unseated upon the intake stroke of the piston within its associated cylinder and thereupon hold the valve off its seat. By providing such an arrangement, but a comparatively small force is required to operate the shaft 26 to put the compressor out of commission by retaining the intake valves off their seats. No force is required to unseat the valves, as this occurs in the ordinary operation of the compressor. Therefore, but enough force to retain the intake valves in open position after they have been thus unseated need be transmitted to the shaft 26 through the arm 26ª and its associated operating mechanism. The presence of the spring connections 28—29 and 30 in the combination permits of a differential action with respect to the two valves.

As is illustrated in Figs. 1 and 2, the housing 19 for the centrifugal mechanism is disposed adjacent the right-hand shaft bearing of the motor 17 and substantially coaxial therewith, said housing being secured to the adjacent bearing by means of bolts passing through apertures 36 in the front plate 37 of the centrifugal device housing, said plate 37 being secured to the body portion of the housing 19 by means of screws 38. The apertures 36 above referred to are clearly illustrated in Fig. 4. Projecting through a suitable opening in the plate 37 of the centrifugal device housing is a shaft 39 which is either an extension of the motor shaft or is a separate shaft mechanically connected with the motor shaft in such a way that it rotates with the motor shaft. The shaft 39 terminates within the housing 19 and is provided with a reduced portion 40 upon which is keyed a sleeve member 41 which projects beyond the end of the shaft 40 toward the left end of the housing 19 as illustrated. As is most clearly shown in Fig. 3, the sleeve member 41 is provided with a ring 42 which encircles the same and is keyed thereto as illustrated in Fig. 4, said ring in turn being provided with bearings 43 for a pair of shafts 44, said shafts being substantially parallel to each other but on opposite sides of the ring 42 and sleeve member 41. The ring 42 is securely retained in position by means of a ring 45 threaded upon the reduced end 46 of the sleeve member 41 and bearing against the ring 42. The ring 45 is split as indicated at 47, and a screw 48 passing through the ring effectually prevents said ring from being removed from the position illustrated in Fig. 4 until the said screw 48 has been loosened.

Pivoted to each of the shafts 44 is a centrifugal weight 49, said centrifugal weights being provided with the bifurcated feet 50. Passing through the body portion of each of the centrifugal weights 49 is a shaft 51, each of said shafts having an annular groove 52 near the central portion thereof. Cotter pins 53 passing through the centrifugal weights 49 engage in the annular grooves 52 and so prevent the shafts 51 from being withdrawn from their associated centrifugal weights, but in no way prevent the centrifugal weights from turning slightly with respect to the shafts. Corresponding ends of the shaft 51 are connected by the comparatively heavy helical springs 54, which tend to retain the weights in the positions illustrated by the full lines in the drawings.

Slidably mounted upon the sleeve member 41 is a sleeve or bushing 55 provided at diametrically opposite points thereof with the pairs of lugs 56. Each of the pairs of lugs 56 is connected by means of a suitable link 57 with the bifurcated foot 50 of the adjacent centrifugal weight 49. From the structure thus far described it will be seen that when the shaft 39 is rotated, the weights 49 will fly outwardly, due to centrifugal stress, and thus the sleeve or bushing 55 will be moved toward the plate 37 of the centrifugal device housing.

Encircling the left-hand end of the sleeve or bushing 55 and abutting against the shoulder 61 is one of a pair of rings 62, between which is disposed a plurality of antifriction balls 63, which are prevented from being thrown from operative position by a ring 64 disposed between the rings 62, the thickness of the ring 64 being slightly less than the diameters of the balls 63 for an obvious purpose. The rings 62 and associated parts are retained in position by means of a split ring 65 similar in all respects to the split ring 47 threaded upon the right hand end of the sleeve member 41, the said split ring 65 being provided with a screw 66 corresponding to the screw 48 of the said ring 47.

Encircling the left-hand end of the sleeve member 41, but preferably clearing the same, as illustrated in the drawings, is a collar 67 provided with ears 68 in which are secured the rods 69, the said rods 69 in turn being slidable in the longitudinal bores through the bosses 70 formed integral with the closure plate 37 for the housing 19. The collar 67 is also provided with hooked arms 71 which project to the right, as shown in Fig. 3, and engage the right-hand one of the rings 62.

Said collar is also provided on the left-hand face thereof with the lugs 72, which are pivoted to the bifurcated end of a crank arm 73 pivoted at 74 to lugs 75 preferably formed integral with the plate 37.

Attention is called to the fact that when the several parts of the centrifugal device are in normal position, the distance from the ears 68 of the collar 67 to the adjacent ends of their associated bosses 70 is slightly less than the distance from the left-hand end of the sleeve or bushing 55 to the shoulder 76 formed upon the left-hand end of the sleeve member 41. As will be more fully hereinafter pointed out, there is at all times exerted upon the crank 73 a force tending to move it in a counter-clockwise direction and thus there is always a tendency to draw the collar 67 toward the bosses 70. However, the force which tends to turn the bell crank 73 in the counter-clockwise direction is overcome by the comparatively heavy springs 54 when the several parts are in normal position.

However, when the centrifugal stress exerted upon the weights 49 is sufficient to throw them outwardly, and the sleeve or bushing 55 is shifted to the left, the force exerted upon the bell crank 73 turns the same in a counter-clockwise direction and moves the collar 67 to the left. As the ears 68 of the collar 67 come into engagement with the bosses 70 before the sleeve or bushing 55 engages the shoulder 76 of the sleeve member 41, it will be seen that when the several parts are in their extreme left positions, the hooked ends of the arm 71 of the collar 67 will clear the one of the rings 62 against which they normally press and consequently there will be no friction at these points tending to prevent the sleeve member 41 and associated parts from rotating freely.

Secured to the small arm of the bell crank 73 is a link 77, which is in turn pivoted to a crank arm 78 rigidly mounted upon a shaft 79 bearing in brackets 80, which are formed integral with a suitable framework 81, which carries resistances of special construction which will be more fully hereinafter described. Rigidly mounted upon one end of the shaft 79 is an arm 82, in turn pivoted to a link 83 which operatively connects the arm 82 with a bell crank lever 84 pivoted at 85. The bell crank lever 84 is also connected by means of a link 86 with the arm 26ª, which arm 26ª is rigidly mounted upon the shaft carrying the devices for operating the inlet valves of the compressor cylinders.

From the above description and the drawings, it is evident that when the centrifugal device is inert, the arm 26ª will be in the position indicated by dotted lines in Fig. 6, and that consequently the inlet valves for the compressor cylinders will be held off their seats. When, however, the centrifugal weights 49 are thrown outwardly, the spring 29 and the spring which normally tends to retain the compressor inlet valve in closed position move the arm 26ª to the position shown in full lines in Fig. 6 and so permit the compressor to operate.

Mounted upon the shaft 79 is a second crank arm indicated at 87 employed to operate a certain switching mechanism which at the proper time cuts out the resistance in the motor circuit. The switching mechanism is illustrated in Figs. 1, 2, 7, 8 and 9, and is diagrammatically shown in Fig. 14. The said switching mechanism comprises a base 88 and suitable screws 89 for retaining the base 88 in any suitable position, said base of course being made of insulating material. Mounted upon the base 88 and disposed side by side near one end of the base are the blocks 90 retained in position by suitable screws or equivalent means. Pivoted to each of the blocks 90 is a lever 91 carrying at its free end a laminated brush contact 92 adapted to bear upon contact block 93. The brush contact 92 and contact block 93 are preferably made of copper and are retained in their respective positions by means of suitable bolts or screws, as shown. The rear end of each of the levers 91, which levers are of conducting material, are provided with conductors 94 secured thereto by screws 95, which conductors 94 form a flexible connection between the movable arm 91 and the base or block 90. This flexible conductor 94 is secured at one end to the movable arms 91 by the screws 95 and at the other end is bolted to the socket terminal clip 97 and the base 90 by means of the bolt 96.

The lever arms 91 are connected by means of a transverse bar 99 of insulating material, above which bar is disposed a plate 100, having a lug 101 arranged to be pivotally attached to the crank arm 87 on the shaft 79 operated by the centrifugal device. Each of the contact blocks 93 is also provided with a suitable terminal.

Secured to the under side of the levers 91 near their pivoted ends are the flat springs 102 of conducting material, which springs have secured upon their outer ends carbon blocks 103, each of said carbon blocks 103 adapted to electrically engage a corresponding carbon block 104 mounted upon and in electrical engagement with one of the contact blocks 93.

Each of the lever arms 91 carries at its free end a hook 105 having a portion disposed under the free end of the adjacent flat spring 102 for a purpose to be presently made apparent. Each of the levers 91 is also provided near its free end with a recess 106 in which is disposed a compression spring 107 bearing against one of the flat springs 102 and tending to move the block 103 carried by said spring into engagement with its corresponding carbon block 104.

Acting between the transverse bar 99 and the base 88 are the helical springs 108, which tend to draw the levers 91 toward the base and so retain the contacts supported by the levers 91 in electrical engagement with their corresponding base-supported contacts. The plate 100 disposed over the bar 99 is provided with a pair of rods 109 passing freely through apertures in the bar 99, said rods 109 being provided at their lower ends with portions 110 of enlarged diameter. Said rods 109 are also provided at their lower ends with washers 111 and between the washers 111 and the bar 99 are the compression springs 112.

From the structure just described it will be seen that when the plate 100 is moved away from the base 88, the springs 108 will retain all of the electrical contacts in closed position until the enlarged portions 110 of the rods 109 come into engagement with the under side of the bar 99. When this occurs the bar 99 and levers 91 will be raised, drawing the laminated brush contacts 92 out of engagement with their contact blocks 93. But the carbon contact blocks 103 will remain for a short time in electrical engagement with their corresponding contact blocks 104 on account of the springs 107 interposed between the levers 91 and their associated flat springs 102. When the hooks 105 come into engagement with the ends of the springs 102, the carbon contact blocks 103 will be lifted out of electrical engagement with their associated contact blocks 104 and consequently electrical connection between the levers 91 and the contact blocks 93 is broken. By drawing the laminated copper contacts 92 out of engagement with the contact blocks 93 before electrical engagement between the carbon contact blocks 103 and 104 is broken, I am enabled to dispense with arcing at the brush contacts 92.

Figure 14:
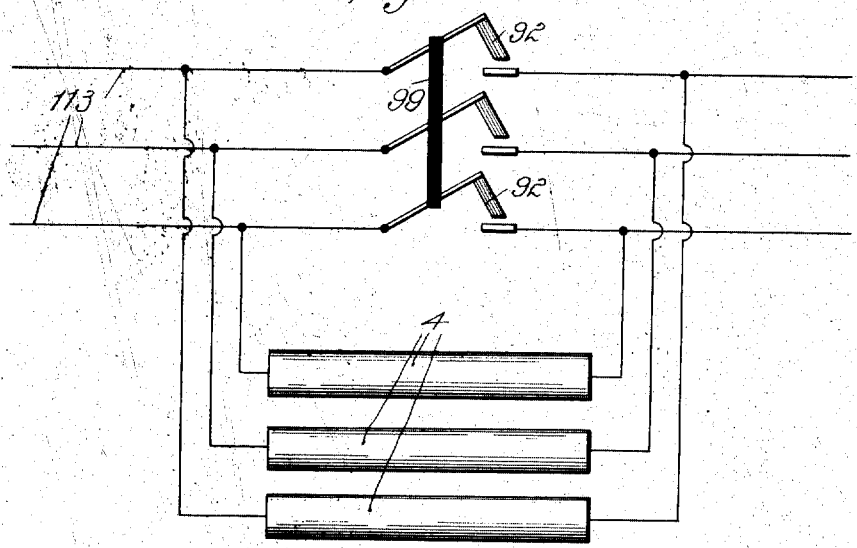
Fig. 14 is a diagrammatic representation of the circuit when an induction motor of the squirrel-cage type is employed.

In Fig. 14 I have diagrammatically illustrated the circuit connections for the squirrel-cage three-phase induction motor illustrated in the drawings, said circuit comprising the line wires 113, the three-lever switch and the carbon resistances 4. I provide one carbon resistance 4 for each of the line wires 113, each one of the resistances having its terminals connected with its associated line wire at points on each side of the three-lever switch. Fig. 14 clearly shows that when the switch is in closed position the resistances 4 are short-circuited, but that when the switch is in open position the energy supplied to the motor is passed through the resistances 4.

Each of the resistances 4 comprises a plurality of carbon disks 114 in intimate contact with each other and disposed in an iron tube 115 having a porcelain fireproof insulating lining 116. Radiating fins 117 are attached to the tube 115 in order that the heat resulting from passing a current through the carbon disks 114 may be dissipated. The tube 115, as is most clearly shown in Fig. 12, is provided at each end with a closure plug 118 of insulating material, through which projects a terminal piece 119 having secured thereto a heavy carbon button 120 bearing against the adjacent carbon disk 114. The terminals 119 have mounted thereon the clamping screws 121 for connecting the said terminals with suitable conductors. As is most clearly shown in Figs. 1 and 2, a framework 81 is provided for supporting the resistance tubes, each of said tubes being retained by a pair of plates 122. As is illustrated in Fig. 2, the clamping screws 121 at the right-hand end of the resistance tubes bear against lugs 123 carried by the framework 81, whereas the heads of the screws 121 at the left-hand ends of the resistance tubes are provided with blocks 124 against which bear compression springs 125, the pressure exerted upon the blocks 124 being determined by screws 126 threaded in the framework 81 and bearing against the compression springs 125. The resistance offered to the current flowing through any one of the resistances may be adjusted to a nicety by varying the compression to which the carbon disks 114 are subjected. By clamping the disks 114 together very tightly, the resistance is less than is the case when the disks are not clamped together so tightly. Moreover, after current has been passing through the resistances for some time, the carbon disks 114 are heated and the resistance to the current flow becomes less. Therefore, if the resistances are included in circuit with a motor, it will be seen that after the motor has started and current has been flowing through the carbon disks 114 for some time, the carbon disks will heat up, the resistance to the current flow will not be so great as before and consequently the motor will be permitted to speed up somewhat.

Having now described the several parts of my invention, I shall describe the operation of the mechanism. When the motor is at rest, the centrifugal device is inert and the several parts thereof are in the positions indicated in full lines in Figs. 3 and 4 of the drawings. This being the case, the levers 91 of the switching mechanism are in open position and the arm 26ᵃ of the compressor unloading mechanism is in the position indicated in dotted lines in Fig. 6. The arm 26ᵃ being in depressed position, the inlet valves of the compressor are held off their seats. When the motor is started the circuit therefor is closed, but, owing to the fact that the switching device is in open position, the electrical energy is supplied to the motor through the carbon resistance bridged across the terminals of the switching mechanism. The resistances being included in circuit, very little energy is supplied to the motor, but, owing to the fact that the compressor inlet valves are open, the only load upon the motor is that due to the friction of the motor and the compressor. As the motor continues to gain speed the centrifugal weights 49 and the centrifugal device are thrown outwardly, thus moving the sleeve or bushing 55 toward the left as shown in Fig. 4, and permitting the springs of the compressor unloading mechanism to act back through its associated connecting links and bell crank levers 73 to move the collar 67 to the left into engagement with the bosses 70 carried by the plate 37 of the centrifugal device housing 19. When this occurs, the pressure exerted upon the inlet valves of the compressor is removed and the same are permitted to perform their intended functions.

Before this occurs, however, the resistances in the motor circuit are short-circuited due to the connection between the shaft 79 and the switching mechanism. Thus, slightly before the pressure exerted upon the inlet valves of the compressor by the plungers 28 is removed, the resistances are short-circuited and the motor allowed to attain its maximum speed. After it has attained its maximum speed, the pressure upon the inlet valves of the compressor is removed and the motor is permitted to drive the compressor. Owing to the lost motion connection between the shaft 79 and the transverse bar 99 of the switching mechanism, it will be seen that the resistances in the motor circuit are short-circuited before the compressor inlet valves are released in order that the motor may be permitted to speed up before the load of the compressor is thrown thereon.

Figure 10:
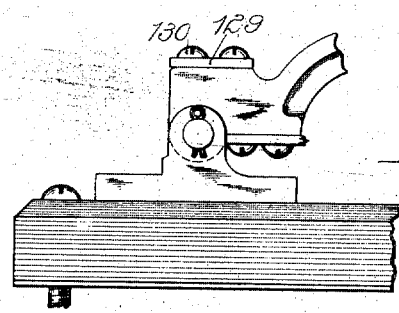
Fig. 10 is a fragmentary side elevational view of the form of switching mechanism employed when an induction motor of the slip-ring type is used to drive the compressor.
Figure 11:
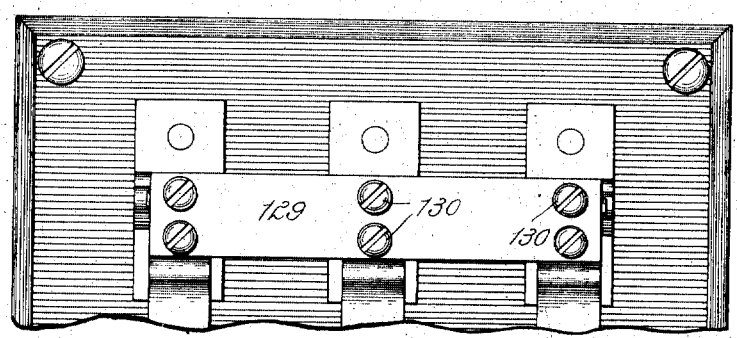
Fig. 11 is a fragmentary plan view of the switching mechanism shown in Fig. 10.
Figure 15:
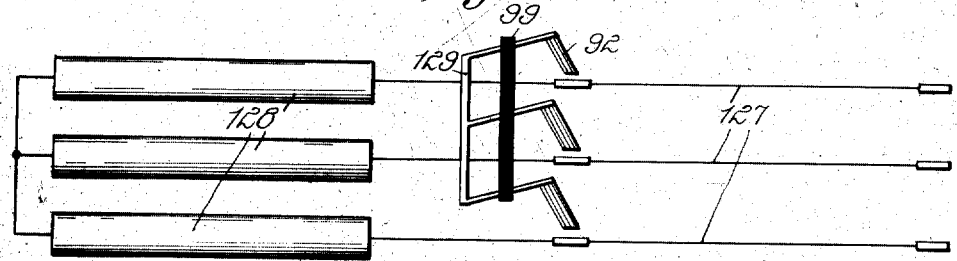
Fig. 15 is a diagrammatic illustration of the circuit connections when an induction motor of the slip-ring type is employed.

In Fig. 15 I have illustrated the circuit arrangement when a slip-ring induction motor is employed. Wires leading to the secondary motor windings are illustrated at 127 and the resistance tubes are shown at 128. The form of switching mechanism employed is diagrammatically illustrated in Fig. 15 and is shown in Figs. 10 and 11 of the drawings. The switching mechanism employed for short-circuiting the resistances when an induction motor of the slip-ring type is used is similar to the switching mechanism shown in Figs. 7, 8 and 9, except that the terminals 96 are dispensed with and the pivoted ends of the switch levers are connected by a transverse conductor plate 129 held in electrical engagement with the switch levers by suitable screws 130.

While I have illustrated my invention in the particular embodiments herein described, it will be understood that I do not limit myself to these constructions, but desire to claim broadly any equivalent constructions coming within the terms and spirit of the appended claims.

What I claim as new and desire to secure by Letters Patent of the United States is:

1. In combination, a compressor, a centrifugal device, a motor arranged to operate the compressor and centrifugal device, said compressor comprising a suction valve, an unloader arranged to retain the suction valve in open position, and mechanical connections between the unloader and centrifugal device whereby said unloader releases the suction valve when the motor has attained a predetermined speed.

2. In combination, a compressor comprising a plurality of suction valves, a centrifugal device, a motor arranged to operate the compressor and centrifugal device, a mechanical unloader arranged to retain the suction valves in open position, and means operatively connecting said centrifugal device and the unloader whereby said unloader releases the suction valves when the motor has attained a predetermined speed.

3. In combination, a compressor comprising a plurality of suction valves, a centrifugal device, a motor arranged to operate the compressor and centrifugal device, a mechanical unloader arranged to retain the suction valves in open position, and means mechanically connecting the centrifugal device and the unloader whereby said unloader releases the suction valves when the motor has attained a predetermined speed.

4. In combination, a compressor comprising a plurality of suction valves, a motor for driving said compressor, and a speed controlled unloader adapted to retain said suction valves in open position until the motor has attained a predetermined speed, said unloader comprising a common operating shaft, an arm on said shaft for each suction valve and a compression spring interposed between each arm and its associated suction valve.

5. In combination, a compressor comprising a plurality of suction valves, a motor for driving the compressor, a centrifugal device driven from said motor, an unloader adapted to temporarily retain the suction valves in open position, and mechanical connections between said centrifugal device and unloader, said centrifugal device comprising a spring tending to operate through said connections and unloader to retain the suction valves in open position when the centrifugal device is inert.

6. In combination, a compressor comprising a valve, an unloader adapted to temporarily affect said valve to render the compressor inoperative, a motor for driving said compressor, a controlling device for said unloader driven by said motor, and mechanical connections between said controlling device and unloader.

7. In combination, a compressor comprising a valve, a motor for driving said compressor, a centrifugal device driven by said motor, and means mechanically controlled by said centrifugal device adapted to affect said valve to render the compressor inoperative while the motor is being started and until the motor has reached a predetermined speed.

8. In combination, a compressor comprising suction valves, a motor for driving said compressor, a centrifugal device driven by said motor, an unloader arranged to temporarily retain said suction valves in open position, said unloader comprising a shaft, an arm carried by said shaft disposed over each suction valve, a compression spring interposed between the free end of each arm and its associated suction valve, and mechanical connections between said shaft and said centrifugal device.

9. In combination, a motor, a compressor driven by the motor, a centrifugal device driven by the motor, an unloader adapted to temporarily render the compressor inoperative, a resistance in the motor circuit, a switch adapted when operated to eliminate the resistance from the motor circuit, and mechanical connections between the centrifugal device and the switch and unloader whereby the unloader is operated to render the compressor operative and the resistance is eliminated from the motor circuit when the motor attains a certain speed.

10. In combination, a motor, a compressor driven by the motor, a controlling device driven by the motor, an unloader adapted to temporarily render the compressor inoperative, a resistance in the motor circuit, a switch adapted when operated to eliminate the resistance from the motor circuit, and mechanical connections between the controlling device and the switch and unloader whereby the unloader is operated to render the compressor operative and the switch is operated to eliminate the resistance from the motor circuit when the motor attains a certain speed.

11. In combination, a motor, a compressor driven by the motor, a centrifugal device driven by the motor, an unloader adapted to temporarily render the compressor inoperative, a resistance in the motor circuit, a switch adapted when operated to eliminate the resistance from the motor circuit, and mechanical connections between the centrifugal device and the switch and unloader whereby the unloader is operated to render the compressor operative and the resistance is eliminated from the motor circuit when the motor attains a certain speed, said switch eliminating the resistance from the motor circuit before the unloader is operated to render the compressor operative.

12. In combination, a motor, a compressor driven by the motor, a controlling device driven by the motor, an unloader adapted to temporarily render the compressor inoperative, a resistance in the motor circuit, a switch adapted when operated to eliminate the resistance from the motor circuit, and mechanical connections between the controlling device and the switch and unloader whereby the unloader is operated to render the compressor operative and the switch is operated to eliminate the resistance from the motor circuit when the motor attains a certain speed, said switch eliminating the resistance from the motor circuit before the unloader is operated to render the compressor operative.

13. In combination, a motor, a compressor driven by the motor, a centrifugal device driven by the motor, said compressor comprising valves, an unloader arranged to temporarily retain said valves in open position to render the compressor inoperative, a resistance included in the motor circuit, a switch adapted when operated to eliminate the resistance from the motor circuit, and mechanical connections between the centrifugal device and unloader and switch whereby the switch is operated to eliminate the resistance from the motor circuit and the unloader is operated to render the compressor operative when the motor attains a certain speed.

14. In combination, a motor, a compressor driven by the motor, a controlling device driven by the motor, said compressor comprising valves, an unloader arranged to temporarily retain said valves in open position to render the compressor inoperative, a resistance included in the motor circuit, a switch adapted when operated to eliminate the resistance from the motor circuit, and mechanical connections between the controlling device and unloader and switch whereby the switch is operated to eliminate the resistance from the motor circuit and the unloader is operated to render the compressor operative when the motor attains a certain speed.

15. In combination, a motor, a compressor driven by the motor, a centrifugal device driven by the motor, said compressor comprising valves, an unloader arranged to temporarily retain said valves in open position to render the compressor inoperative, a resistance included in the motor circuit, a switch adapted when operated to eliminate the resistance from the motor circuit, and mechanical connections between the centrifugal device and unloader and switch whereby the switch is operated to eliminate the resistance from the motor circuit and the unloader is operated to render the compressor operative when the motor attains a certain speed, said switch eliminating the resistance from the motor circuit before the unloader is operated to render the compressor operative.

16. In combination, a motor, a compressor driven by the motor, a controlling device driven by the motor, said compressor comprising valves, an unloader arranged to temporarily retain said valves in open position to render the compressor inoperative, a resistance included in the motor circuit, a switch adapted when operated to eliminate the resistance from the motor circuit, and mechanical connections between the controlling device and unloader and switch whereby the switch is operated to eliminate the resistance from the motor circuit and the unloader is operated to render the compressor inoperative when the motor attains a certain speed.

17. In combination, a motor, a compressor driven by the motor, a centrifugal device driven by the motor, an unloader adapted to temporarily render the compressor inoperative, mechanical connections between the centrifugal device and unloader whereby the unloader is operated to render the compressor operative when the motor attains a certain speed, a resistance normally included in the motor circuit, and means for eliminating said resistance from the motor circuit when the motor attains a certain speed.

18. In combination, a motor, a compressor driven by the motor, a centrifugal device driven by the motor, an unloader adapted to temporarily render the compressor inoperative, mechanical connections between the centrifugal device and unloader whereby the unloader is operated to render the compressor operative when the motor attains a certain speed, a resistance normally included in the motor circuit, and switching mechanism for eliminating said resistance from the motor circuit when the motor attains a certain speed.

19. In combination, a motor, a compressor driven by the motor, a centrifugal device driven by the motor, an unloader adapted to temporarily render the compressor inoperative, mechanical connections between the centrifugal device and unloader whereby the unloader is operated to render the compressor operative when the motor attains a certain speed, a resistance normally included in the motor circuit, and mechanism for eliminating the resistance from the motor circuit before the unloader is operated to render the compressor operative.

20. In combination, a motor, a compressor driven by the motor, a centrifugal device driven by the motor, an unloader adapted to temporarily render the compressor inoperative, mechanical connections between the centrifugal device and unloader whereby the unloader is operated to render the compressor operative when the motor attains a certain speed, a resistance normally included in the motor circuit, and mechanism operated by the centrifugal device adapted to eliminate the resistance from the motor circuit before the unloader is operated to render the compressor inoperative.

21. In combination, a motor, a compressor driven by the motor, a controlling device driven by the motor, an unloader adapted to temporarily render the compressor inoperative, mechanical connections between the controlling device and unloader whereby the unloader is operated to render the compressor operative when the motor attains a certain speed, a resistance normally included in the motor circuit, and means for eliminating said resistance from the motor circuit when the motor attains a certain speed.

22. In combination, a motor, a compressor driven by the motor, a controlling device driven by the motor, an unloader adapted to temporarily render the compressor inoperative, mechanical connections between the controlling device and unloader whereby the unloader is operated to render the compressor operative when the motor attains a certain speed, a resistance normally included in the motor circuit, and switching mechanism for eliminating said resistance from the motor circuit when the motor attains a certain speed.

23. In combination, a motor, a compressor driven by the motor, a controlling device driven by the motor, an unloader adapted to temporarily render the compressor inoperative, mechanical connections between the controlling device and unloader whereby the unloader is operated to render the compressor operative when the motor attains a certain speed, a resistance normally included in the motor circuit, and mechanism for eliminating the resistance from the motor circuit before the unloader is operated to render the compressor operative.

24. In combination, a motor, a compressor driven by the motor, a controlling device driven by the motor, an unloader adapted to temporarily render the compressor inoperative, mechanical connections between the controlling device and unloader whereby the unloader is operated to render the compressor operative when the motor attains a certain speed, a resistance normally included in the motor circuit, and mechanism operated by the centrifugal device adapted to eliminate the resistance from the motor circuit before the unloader is operated to render the compressor inoperative.

25. In combination, a motor, a compressor driven by the motor, a centrifugal device driven by the motor, an unloader adapted to temporarily render the compressor inoperative, a resistance in the motor circuit, a switch lever arranged when operated to eliminate the resistance from the motor circuit, connections between the unloader and centrifugal device whereby the unloader is operated to render the compressor operative when the motor attains a certain speed, and a lost-motion connection between the centrifugal device and switch lever whereby the switch lever eliminates the resistance from the motor circuit before the compressor is rendered operative by the unloader.

26. In combination, a motor, a compressor driven by the motor, a centrifugal device driven by the motor, an unloader adapted to temporarily render the compressor inoperative, a resistance in the motor circuit, a switching device arranged when operated to eliminate the resistance from the motor circuit, connections between the unloader and centrifugal device whereby the unloader is operated to render the compressor operative when the motor attains a certain speed, and a lost-motion connection between the centrifugal device and switching device whereby the switching device eliminates the resistance from the motor circuit before the compressor is rendered operative by the unloader.

27. In combination, a motor, a compressor driven by the motor, a controlling device driven by the motor, an unloader adapted to temporarily render the compressor inoperative, a resistance in the motor circuit, a switching device arranged when operated to eliminate the resistance from the motor circuit, connections between the unloader and controlling device whereby the unloader is operated to render the compressor operative when the motor attains a certain speed, and a lost-motion connection between the controlling device and switching device whereby the switching device eliminates the resistance from the motor circuit before the compressor is rendered operative by the unloader.

28. In combination, a motor, a compressor driven by the motor, a centrifugal device driven by the motor, a starting resistance in the motor circuit, devices mechanically operated by the centrifugal device arranged to eliminate the starting resistance from the motor circuit when the motor attains a certain speed, and devices normally rendering the compressor inoperative mechanically controlled by the centrifugal device and adapted to render the compressor operative when the motor attains a predetermined speed.

29. In combination, a motor, a compressor driven by the motor, a centrifugal device driven by the motor, a starting resistance in the motor circuit, devices normally rendering the compressor inoperative, said last-mentioned devices mechanically connected with the centrifugal device and adapted to render the compressor operative when the motor attains a certain speed, together with switching mechanism arranged to eliminate the resistance from the motor circuit before the compressor is rendered operative.

30. In combination, a motor, a compressor driven by the motor, a controlling device driven by the motor, a starting resistance in the motor circuit, devices mechanically operated by the controlling device arranged to eliminate the starting resistance from the motor circuit when the motor attains a certain speed, and devices normally rendering the compressor inoperative mechanically controlled by the controlling device and adapted to render the compressor operative when the motor attains a predetermined speed.

31. In combination, a motor, a compressor driven by the motor, a centrifugal device driven by the motor, an unloader normally adapted to render the compressor inoperative, devices connecting the centrifugal device and unloader whereby the unloader is capable of rendering the compressor operative when the motor attains a certain speed, a starting resistance in the motor circuit, said starting resistance comprising a plurality of carbon plates and means for varying the compression to which said plates are subjected, and means for eliminating said resistance from the motor circuit before the compressor is rendered operative by the unloader.

32. In combination, a motor, a compressor driven by the motor, a centrifugal device driven by the motor, an unloader normally adapted to render the compressor inoperative, connections between the unloader and centrifugal device whereby the unloader is capable of rendering the compressor operative when the motor reaches a certain speed, a starting resistance in the motor circuit, said resistance comprising a plurality of carbon plates and means for varying the compression to which said plates are subjected together with switching mechanism arranged to eliminate said resistance from the motor circuit when the motor attains a certain speed.

33. In combination, a motor, a compressor driven by the motor, a controlling device driven by the motor, an unloader normally adapted to render the compressor inoperative, devices connecting the controlling device and unloader whereby the unloader is capable of rendering the compressor operative when the motor attains a certain speed, a starting resistance in the motor circuit, said starting resistance comprising a plurality of carbon plates and means for varying the compression to which said plates are subjected, and means for eliminating said resistance from the motor circuit before the compressor is rendered operative by the unloader.

34. In combination, a motor, a compressor driven by the motor, a controlling device driven by the motor, an unloader normally adapted to render the compressor inoperative, connections between the unloader and controlling device whereby the unloader is capable of rendering the compressor operative when the motor reaches a certain speed, a starting resistance in the motor circuit, said resistance comprising a plurality of carbon plates and means for varying the compression to which said plates are subjected together with switching mechanism arranged to eliminate said resistance from the motor circuit when the motor attains a certain speed.

35. In combination a compressor having a valve, a motor for driving said compressor, a resistance for the circuit of said motor, said resistance being in series with said motor during starting of the same, a speed controlled governor device driven by said motor, means controlled by said governing device for holding said compressor valve open during starting of said motor, said resistance being decreased by flow of current therethrough, and means for shunting out said resistance, said governing device being effective at a predetermined speed to shunt said resistance and to close said valve.

36. In combination a compressor comprising a plurality of suction valves, a motor for driving said compressor, and a mechanically operated unloader adapted to retain said suction valves in open position until the motor has attained a predetermined speed, said unloader comprising a common operating shaft, an arm on said shaft for each suction valve, and a compression spring interposed between each arm and its associated suction valve, said spring being of insufficient strength to unseat the corresponding suction valve during the compression stroke of the compressor.

37. In combination, a compressor comprising a plurality of suction valves, a motor for driving said compressor, and a mechanically operated unloader adapted to retain said suction valves in open position until the motor has attained a predetermined speed, said unloader comprising a common operating shaft and individual spring means interposed between said common operating shaft and each suction valve, said means being adapted to unseat said valves but being of insufficient strength to unseat a valve during a compression stroke of the compressor.

38. In combination a driving motor of the constant speed type, a compressor connected to be driven by said motor, said compressor having a suction valve, a centrifugal governor having an arm adapted to be thrown suddenly outward at a critical speed in order to obtain a snap action, and a connection between said arm and said suction valve for unseating said valve with a snap action below a critical speed and for seating the same with a snap action above said critical speed.

In witness whereof, I hereunto subscribe my name this 3rd day of December A. D. 1913.

WALTER J. RICHARDS.

Witnesses:
 Thos. T. Bours,
 R. H. Weiland.